United States Patent
Ooba et al.

(10) Patent No.: US 11,538,201 B2
(45) Date of Patent: Dec. 27, 2022

(54) DISPLAY DEVICE AND DISPLAY PROGRAM

(71) Applicant: FANUC CORPORATION, Yamanashi (JP)

(72) Inventors: Masafumi Ooba, Yamanashi (JP); Wataru Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/090,963

(22) Filed: Nov. 6, 2020

(65) Prior Publication Data

US 2021/0174555 A1 Jun. 10, 2021

(30) Foreign Application Priority Data

Dec. 4, 2019 (JP) .............................. JP2019-219471

(51) Int. Cl.
| | |
|---|---|
| *G06T 11/00* | (2006.01) |
| *G09G 5/38* | (2006.01) |
| *G06T 7/70* | (2017.01) |
| *G05B 19/4155* | (2006.01) |

(52) U.S. Cl.
CPC .......... *G06T 11/00* (2013.01); *G05B 19/4155* (2013.01); *G06T 7/70* (2017.01); *G09G 5/38* (2013.01); *G05B 2219/40353* (2013.01); *G06T 2207/20081* (2013.01); *G09G 2340/0464* (2013.01); *G09G 2340/12* (2013.01)

(58) Field of Classification Search
CPC .............. G06T 11/00; G06T 7/70; G09G 5/38
See application file for complete search history.

(56) References Cited

U.S. PATENT DOCUMENTS

| | | | |
|---|---|---|---|
| 6,944,584 B1* | 9/2005 | Tenney | B25J 9/1671 700/17 |
| 8,271,132 B2* | 9/2012 | Nielsen | B25J 9/162 700/250 |
| 2005/0149231 A1* | 7/2005 | Pretlove | B25J 9/1671 700/264 |
| 2014/0125698 A1* | 5/2014 | Latta | A63F 13/65 345/633 |
| 2017/0165841 A1* | 6/2017 | Kamoi | H04N 5/23293 |
| 2020/0101599 A1* | 4/2020 | Yoshida | B25J 9/161 |

FOREIGN PATENT DOCUMENTS

JP 6385627 B1 9/2018

\* cited by examiner

*Primary Examiner* — Samantha (Yuehan) Wang
(74) *Attorney, Agent, or Firm* — Studebaker & Brackett PC

(57) ABSTRACT

A display device includes an augmented reality display part that displays a virtual robot that operates in accordance with a predetermined program together with objects in real space, a position detection part that detects the position of a work target in real space by measuring a distance to the work target from the augmented reality display part, and a control part that causes the virtual robot displayed on the augmented reality display part to operate based on the position of the work target detected by the position detection part to perform predetermined work on the work target.

9 Claims, 5 Drawing Sheets

DISPLAY DEVICE AND DISPLAY PROGRAM

This application is based on and claims the benefit of priority from Japanese Patent Application 2019-219471, filed on 4 Dec. 2019, the content of which is incorporated herein by reference.

BACKGROUND OF THE INVENTION

Field of the Invention

The present invention relates to a display device and a display program.

Related Art

Conventionally, in a system that performs predetermined work on a workpiece transported by a conveyor, for example, when an additional robot is installed during a busy season, there is a case where it is desired to check in advance the layout of a work site after the robot is installed. In addition, to know the improvement effect of work by installing an additional robot, there is also a case where it is desired to check in advance the processing capacity of the robot when the robot is installed in a work site.

Japanese Patent No. 6385627 discloses a display controller for presenting information that enables the user to visually understand a relationship between a current position of an operating device and a target position at which the operating device is to be moved. The display controller includes an information processing part that generates the three-dimensional data of the aiming coordinate axis that passes through a control point set in a device to be driven and includes a first straight line in a virtual space defined by the three-dimensional data of a structure based on the three-dimensional data of the device to be driven and the three-dimensional data of the structure; and an output control part that generates control information for displaying the aiming coordinate axis on an output device based on the three-dimensional data of the device to be driven, the three-dimensional data of the structure, and the three-dimensional data of the aiming coordinate axis generated by the information processing part. The first straight line is a line segment of a portion up to an intersection of the control point and the surface of the structure.

Patent Document 1: Japanese Patent No. 6385627

SUMMARY OF THE INVENTION

In checking the layout of the work site after installing the additional robot, it is necessary to review the layout of the work site by adding the robot to a drawing of an existing system and checking the work range, etc. of the robot. Therefore, it takes a long time to actually install the robot in the work site and start the work.

In addition, to check the processing capacity of the robot in advance, conventionally, the improvement effect of the work by the robot is evaluated by simulating the flow of the workpiece and operating the robot in offline software. However, with the offline software, it is difficult to accurately reproduce the actual flow of the workpiece, and the improvement effect of the work cannot be accurately evaluated.

Therefore, it is desired that the layout of the work site and the processing capacity of the robot for the work can be easily checked before the robot is actually installed in the work site.

An aspect of a display device of the present disclosure includes an augmented reality display part that displays a virtual robot that operates in accordance with a predetermined program together with objects in real space, a position detection part that detects a position of a work target in real space by measuring a distance to the work target from the augmented reality display part, and a control part that causes the virtual robot displayed on the augmented reality display part to operate based on the position of the work target detected by the position detection part to perform predetermined work on the work target.

An aspect of a display program of the present disclosure causes a computer to function as a display device. The display device includes an augmented reality display part that displays a virtual robot that operates in accordance with a predetermined program together with objects in real space, a position detection part that measures a position of a work target from the augmented reality display part, and a control part (4) that causes the virtual robot displayed on the augmented reality display part to operate based on the position of the work target measured by the position detection part to perform predetermined work on the work target.

According to the aspect of the display device of the present disclosure, it is possible to easily check the layout of the work site and the processing capacity of the robot for the work before actually installing the robot in the work site. According to the aspect of the display program of the present disclosure, it is possible to easily check the layout of the work site and the processing capacity of the robot for the work with the computer before actually installing the robot in the work site.

DETAILED DESCRIPTION OF THE INVENTION

Figure 1:
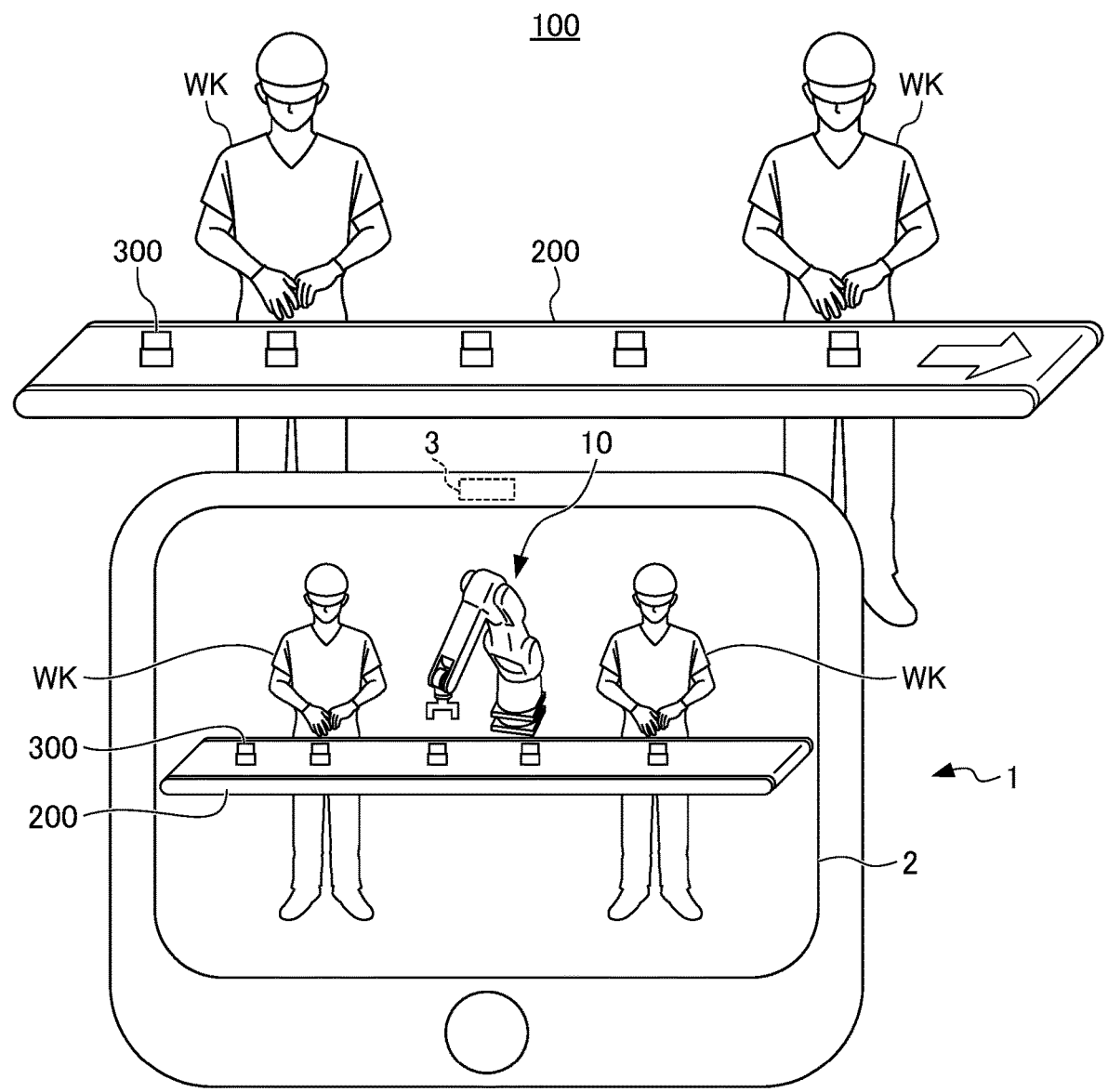
FIG. 1 is a diagram showing a state of using a display device according to an aspect of the present disclosure.
Figure 2:
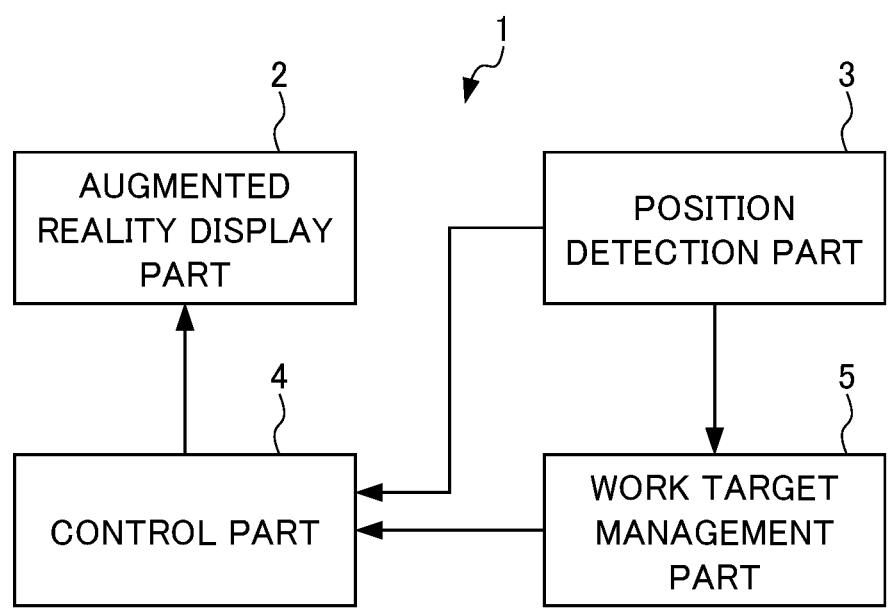
FIG. 2 is a block diagram showing the configuration of the display device according to the aspect of the present disclosure.

Hereinafter, an aspect of the present disclosure will be described with reference to the accompanying drawings. FIG. 1 is a diagram showing a state of using a display device according to an aspect of the present disclosure. FIG. 2 is a block diagram showing the configuration of the display device according to the aspect of the present disclosure.

A display device 1, for example, when considering the installation of a new robot in a work site 100 in a factory, allows the user to check the layout of the work site 100 after installing the robot and the processing capacity of the robot in advance. The display device 1 shown in FIG. 1 is configured by a tablet computer including a liquid crystal monitor screen as a display part.

In the work site 100 (object) in real space shown in FIG. 1, a conveyor 200 (object) for conveying a plurality of work targets 300 (objects) in one direction shown by a white arrow is installed. It shows that in the work site 100, two workers WK (objects) perform work on the work targets 300 transported by the conveyor 200.

As shown in FIG. 2, the display device 1 includes an augmented reality display part 2, a position detection part 3, a control part 4, and a work target management part 5. As shown in FIG. 1, the augmented reality display part 2 displays a virtual robot 10 together with objects (in the present embodiment, the work site 100, the conveyor 200, the work targets 300, and the workers WK) in real space. The augmented reality display part 2 is generally configured by a monitor screen of a computer, and displays, for example, the objects in real space imaged by an imaging device provided in the display device 1 together with the virtual robot 10.

The virtual robot 10 is a virtual object displayed on the augmented reality display part 2 according to a predetermined program stored in advance in the display device 1, and does not exist in real space. However, the augmented reality display part 2 displays an augmented reality image as if the virtual robot 10 is present (installed) in the work site 100 in real space by three-dimensionally superimposing the virtual robot 10 on the objects in real space to display the virtual robot 10. The virtual robot 10 can operate to perform predetermined work based on a work program on the work targets 300 on the augmented reality display part 2 as in the case where the robot is actually installed in real space. The predetermined work includes, for example, all work that the robot can execute on the work target 300, such as delivery work to grasp the work target 300 and transfer it from the conveyor 200 to another location, and seal application work.

The augmented reality display part 2 is configured to be able to arrange the virtual robot 10 at an arbitrary position. For example, if the augmented reality display part 2 is configured by a touch panel, the virtual robot 10 can be arranged at an arbitrary position where the installation of the robot is planned in real space displayed on the augmented reality display part 2 by the operator of the display device 1 touching the virtual robot 10 with a finger or a touch pen and moving it to an arbitrary position within the augmented reality display part 2. The display of the virtual robot 10 on the augmented reality display part 2 is realized by the function of the control part 4 described later.

The position detection part 3 has a function of detecting the position of the work target 300 from the augmented reality display part 2. Specifically, the position detection part 3 is configured to include an imaging device such as a two-dimensional camera capable of imaging the work target 300, a distance image sensor, etc. FIG. 1 shows an example in which the position detection part 3 is configured by the distance image sensor provided on the surface opposite to the surface on which the augmented reality display part 2 is disposed in the display device 1. However, the position detection part 3 may be an imaging device, a distance image sensor, etc. provided separately from the display device 1. If an imaging device such as a two-dimensional camera is used, the position of the work target 300 can be detected by machine learning the visibility and position of the work target 300. As shown in FIG. 1, the position detection part 3 configured by the distance image sensor can also have a function of displaying an image of the object in real space on the augmented reality display part 2. The position detection part 3 measures a distance from the augmented reality display part 2 to the work target 300 by performing image processing on an image of the work target 300 in real space according to a predetermined processing program. The detection of the position of the work target 300 by the position detection part 3 is realized by the function of the work target management part 5 described later.

The control part 4 has a function of superimposing the virtual robot 10 on the objects in real space displayed on the augmented reality display part 2 to three-dimensionally display the virtual robot 10 and causing the virtual robot 10 displayed on the augmented reality display part 2 to operate based on the position of the work target 300 detected by the position detection part 3 to perform predetermined work on the work target 300.

Specifically, the control part 4 is configured by an arithmetic processing unit such as a central processing unit (CPU). The control part 4 includes an auxiliary storage device such as a hard disk drive (HDD) or a solid state drive (SSD) that stores various programs for executing various functions of the display device 1 and a main storage device such as a random access memory (RAM) for storing data temporarily required when the arithmetic processing unit executes the program. In the control part 4, the arithmetic processing unit reads various programs from the auxiliary storage device, and performs arithmetic processing based on these various programs while deploying the various programs read in the main storage device. The control part 4 is configured to function as the display device 1 by controlling each hardware connected to the control part 4, such as the augmented reality display part 2 and the position detection part 3, based on the arithmetic result.

The control part 4 adjusts the size of the virtual robot 10 displayed on the augmented reality display part 2 according to the scale of the objects in real space displayed with the virtual robot 10. Alternatively, the control part 4 adjusts the sizes of the objects in real space displayed on the augmented reality display part 2 according to the scale of the virtual robot 10 displayed on the augmented reality display part 2. The scale of the objects in real space is acquired based on an image of the objects in real space taken by the position detection part 3, another imaging device, or the like. Thus, the control part 4 superimposes and displays the virtual robot 10 on the objects (the work site 100, the conveyor 200, the work targets 300, and the workers WK) in real space on the augmented reality display unit 2 so that their relative positional relationships in real space are maintained.

The work target management part 5 measures the current position of the work target 300 based on the position of the work target 300 detected by the position detection part 3. Specifically, since the work target 300 on the conveyor 200 is continuously or intermittently transported at a constant speed by the drive of the conveyor 200, in order for the virtual robot 10 to perform predetermined work on the work target 300, it is necessary to always grasp the current position of the work target 300 on the augmented reality display part 2 based on the movement speed of the work target 300 (the conveyance speed of the conveyor 200) and check whether the work target 300 is within the work range of the virtual robot 10. Therefore, the work target management part 5 uses the position detection part 3 to detect the position at least two times in succession with respect to any of the work targets 300 that can be regarded as the same object among a plurality of the work targets 300 displayed on the augmented reality display unit 2 and transported by the conveyor 200, and measures the movement speed of the work target 300 from the detection results.

Figure 3:
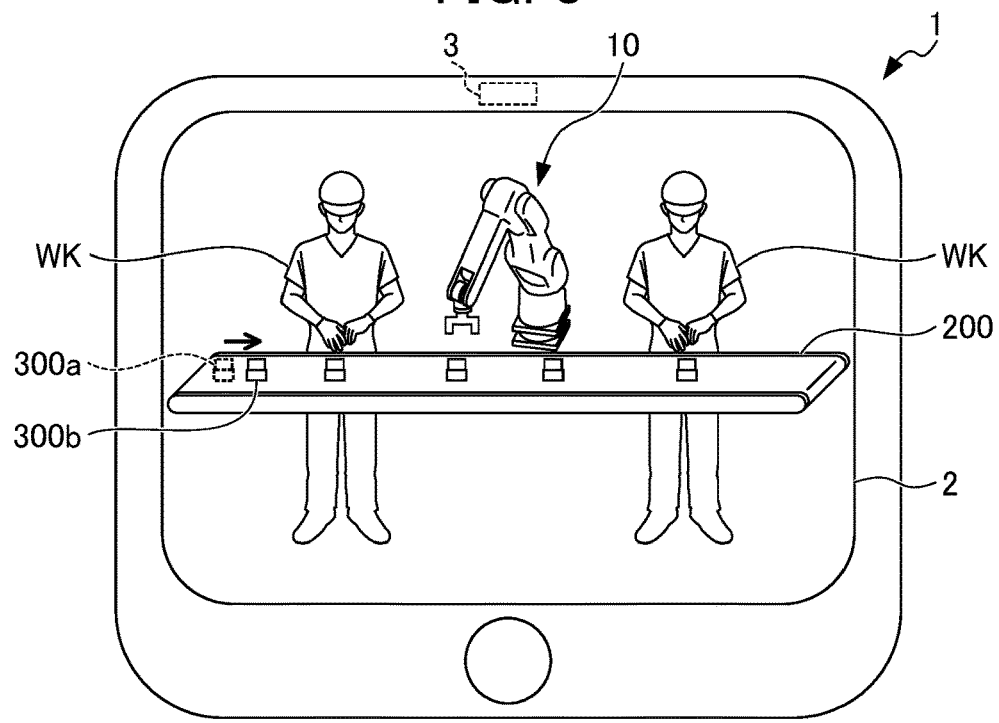
FIG. 3 is a diagram showing the measurement of a movement speed of a work target in the display device according to the aspect of the present disclosure.

FIG. 3 shows the measurement of a movement speed of the work target 300 in the display device 1. For example, in the case of focusing on one work target 300 at the left end on the conveyor 200 displayed on the augmented reality display part 2, by performing two successive position detections on the work target 300, the position of the work target 300a (indicated by a dashed line in FIG. 3) is detected at the first time, and the position of the work target 300b (indicated by a solid line in FIG. 3) moved from the position of the work target 300a by a predetermined distance is detected at the second time. The work target management part 5 measures the movement speed of the work target 300 by dividing the movement distance from the position of the work target 300a to the position of the work target 300b by the time interval from the first position detection to the second position detection. The work target management part 5 detects the current position of the work target 300 on the augmented reality display part 2 an a predetermined control cycle based on the measured movement speed of the work target 300. All or part of the functions of the work target management part 5 may be included in the control part 4.

Figure 5:
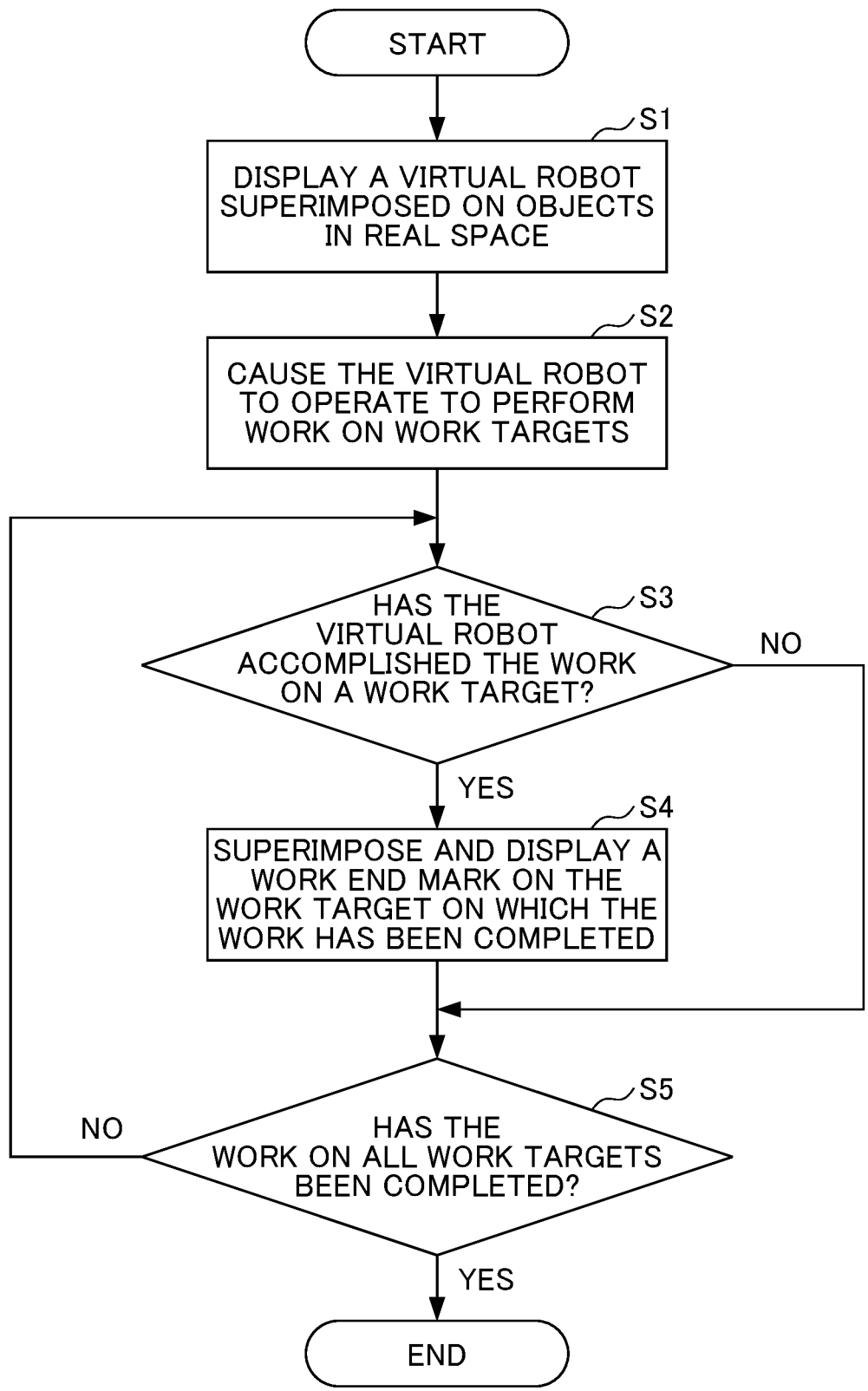
FIG. 5 is a flowchart showing a display method in the display device according to the aspect of the present disclosure.

Next, a display method using the display device 1 will be described with reference to the flowchart shown in FIG. 5. First, the operator activates the display device 1, and takes an image of the work site 100 in real space as shown in FIG. 1 by means of the position detection part 3, which also functions as an imaging device. Thus, the display device 1 superimposes and displays the virtual robot 10 on the image of the objects (the work site 100, the conveyor 200, the work targets 300, and the workers WK) in real space on the augmented reality display part 2 (S1).

The position and the posture of the virtual robot 10 are displayed in the same coordinate system as the coordinate system for the positions of the objects in real space obtained by the position detection part 3. The operator arranges the virtual robot 10 at an arbitrary position where the robot is desired to be installed on the augmented reality display part 2 by touching and moving the virtual robot 10 with a finger or a touch pen.

After the virtual robot 10 is arranged at an arbitrary position on the augmented reality display part 2, the display device 1 detects the position of the work target 300 on the augmented reality display part 2 using the position detection part 3, for example, with an input instruction from the operator to start the operation of the virtual robot 10 as a trigger. Furthermore, the display device 1 measures the movement speed of the work target 300 from the position, and continuously measures the current position of each work target 300 on the augmented reality display part 2 from the measurement result. The display device 1 causes the virtual robot 10 displayed on the augmented reality display part 2 to operate based on the measured current position of the work target 300 to perform predetermined work on the work target 300 (S2).

After the start of the operation of the virtual robot 10, the display device 1 monitors whether the current position of the work target 300 has entered the work range of the virtual robot 10 in the control part 4. When the work target 300 on the augmented reality display part 2 enters the work range of the virtual robot 10, the display device 1 causes the virtual robot 10 to operate to perform the work while following the work target 300 based on the current position of the work target 300. This allows the virtual robot 10 to perform an operation such as virtually grasping the work target 300 on the augmented reality display part 2 and transferring it to another location.

The work of the virtual robot 10 is determined to have been accomplished when the virtual robot 10 can move to follow the current position of the work target 300 and virtually grasp the work target 300. Therefore, the display device 1 detects whether the work of the virtual robot 10 on the work target 300 has been accomplished by monitoring the positional relationship between the virtual robot 10 (for example, the position of the tip of the virtual robot 10) and the work target 300 on the augmented reality display part 2 in the control part 4 or the work target management part 5 (S3).

Figure 4:
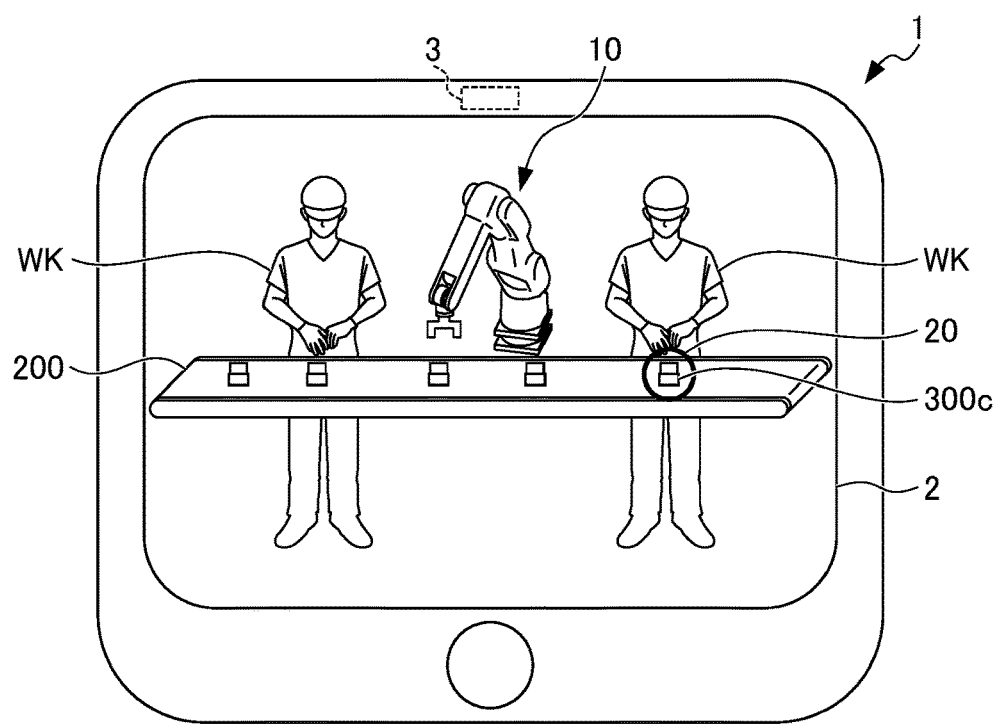
FIG. 4 is a diagram showing a state of displaying information indicating that predetermined work on a work target has been accomplished in the display device according to the aspect of the present disclosure.

When the work of the virtual robot 10 on the work target 300 is accomplished in the above Step S3 (Step 33; YES), the display device 1 superimposes and displays a work end mark 20, indicating that the work has been accomplished, on the work target 300c on which the work has been completed as shown in FIG. 4 (S4). The work end mark 20 shown in FIG. 4 is indicated by a circle surrounding the work target 300c. However, the work end mark 20 may be any mark as long as the work target 300c on which the work has been completed can be identified on the augmented reality display part 2. When the work of the virtual robot 10 on the work target 300 is not accomplished in Step S3, (Step 33; NO), the display device 1 does not display the work end mark 20 with respect to the work target 300, and shifts to the process of Step S5.

The work of the virtual robot 10 is continued while the work target 300 transported by the conveyor 200 is present (S5). When the work target 300 transported by the conveyor 200 is present on the augmented reality display part 2, or when there is no input instruction for ending the operation of the virtual robot 10 by the operator (Step S5; NO), the processing from Step S3 is repeated. When the work target 300 transported by the conveyor 200 is not present or when an input instruction for ending the operation of the virtual robot 10 is issued by the operator, the operation of the virtual robot 10 is stopped.

Figure 6:
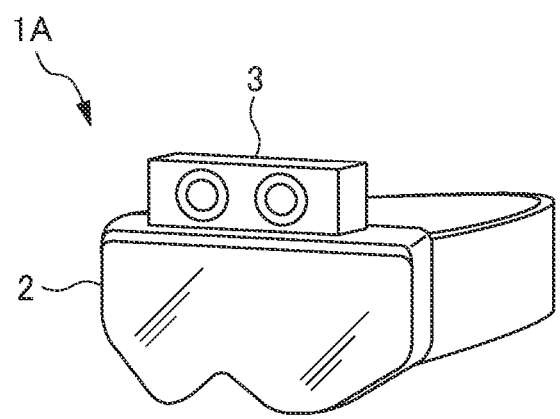
FIG. 6 is a schematic view showing a display device according to another aspect of the present disclosure.

The display device 1 is not limited to a device configured by a tablet computer. The display device 1 may be a computer having a display part capable of displaying an image, and may be, for example, a notebook personal computer, another portable terminal, or the like. Furthermore, as in a display device 1A shown in FIG. 6, a head-mounted display including a position detection part 3 integrated with an augmented reality display part 2 may be used. A control part 4 and a work target management part 5 may be built in the head-mounted display, or may be provided separately from the head-mounted display and connected to be communicable by wire or wireless.

Each of the augmented reality display part 2, the position detection part 3, the control part 4, and the operation object management part 5 in the display device 1, 1A can be realized by hardware, software, or a combination thereof. The display method performed by the cooperation of the augmented reality display part 2, the position detection part 3, the control part 4, and the work target management part 5 can also be realized by hardware, software, or a combination thereof. In this regard, being realized by software means being realized by the computer reading and executing a program.

The programs are stored using various types of non-transitory computer readable media and supplied to a computer. The non-transitory computer readable media include various types of tangible storage media. The non-transitory computer readable media include magnetic recording media (e.g., flexible disks, magnetic tapes, hard disk drives), magneto-optical recording media (e.g., magneto-optical disks), CD-ROMs (read only memories), CD-Rs, CD-R/Ws, and semiconductor memories (e.g., mask ROMs, PROMs (programmable ROMs), EPROMs (erasable PROMs), flash ROMs, RAMs (random access memories)). The programs may also be supplied to various types of transitory computers. The transitory computer readable media include electrical signals, optical signals, and electromagnetic waves. The transitory computer readable media can supply the program to the computer via a wired communication path of electric wires or optical fibers, or a wireless communication path.

One aspect of the display device 1, 1A of the present disclosure described above has the following effects. The display device 1, 1A of the present disclosure includes an augmented reality display part 2 that displays a virtual robot 10 that operates in accordance with a predetermined program together with objects (a work site 100, a conveyor 200, a work target 300, and a worker WK) in real space, a position detection part 3 that detects a position of a work target 300 in real space by measuring a distance to the work target 300 from the augmented reality display part 2, and a control part 4 that causes the virtual robot 10 displayed on the augmented reality display part 2 to operate based on the position of the work target 300 detected by the position detection part 3 to perform predetermined work on the work target 300. Thus, it is possible to check the layout when the robot is installed in the work site 100 and the operation of the robot on the augmented reality display part 2. Therefore, to check the layout of the work site after the robot is installed, it is not necessary to add the robot to the drawing of an existing system, or to simulate the flow of a workpiece and operate the robot in offline software, or the like, and thus it is possible to easily check the layout of the work site 100 and the processing capacity of the robot for the work before actually installing the robot in the work site 100.

Furthermore, the display device 1, 1A of the present disclosure further includes a work target management part 5 that measures a current position of the work target 300 based on the position of the work target 300 detected by the position detection part 3. Thus, since the relative positional relationship between the virtual robot 10 and the work target 300 on the augmented reality display part 2 can be accurately grasped, the processing capacity of the robot for the work can be more accurately determined.

The work target management part 5 measures a movement speed of the work target 300 from results of detecting the position at least two times by the position detection part 3 with respect to the work target 300 that can be regarded as the same object, and measures the current position of the work target 300 based on the movement speed. Thus, the work target management part 5 can grasp an accurate movement speed of the work target 300 and can measure an accurate current position of the work target 300 without being affected by the conveyance accuracy of the conveyor 200.

When the current position of the work target 300 measured by the work target management part 5 enters a work range of the virtual robot 10, the control part 4 causes the virtual robot 10 to operate to perform the work while following the work target 300 based on the current position of the work target 300. This allows the virtual robot 10 to operate on the work target 300 to perform the work in the same manner as the work by the operation of a real robot. Therefore, the operator can more accurately grasp the processing capacity of the real robot for the work target 300 on the augmented reality display part 2.

The augmented reality display part 2 is configured to be able to arrange the virtual robot 10 at an arbitrary position. This enables the virtual robot 10 on the augmented reality display part 2 to be arranged to match the installation position of the real robot in accordance with the arrangement of the objects in real space displayed on the augmented reality display part 2.

The augmented reality display part 2 superimposes and displays information indicating that predetermined work has been accomplished on the work target 300. This enables the operator to easily check the status of the work accomplished of the virtual robot 10 on the work target 300 on the augmented reality display part 2.

In addition, a display program of the present disclosure causes a computer to function as a display device 1, 1A. The display device 1, 1A includes an augmented reality display part 2 that displays a virtual robot 10 that operates in accordance with a predetermined program together with objects (a work site 100, a conveyor 200, a work target 300, and a worker WK) in real space, a position detection part 3 that detects a position of a work target 300 by measuring a distance to the work target 300 in real space from the augmented reality display part 2, and a control part 4 that causes the virtual robot 10 displayed on the augmented reality display part 2 to operate based on the position of the work target 300 detected by the position detection part 3 to perform predetermined work on the work target 300. Thus, by executing the display program on the computer of the display device 1, 1A including the augmented reality display part 2, the position detection part 3, and the control part 4, it is possible to easily check the layout of the work site 100 and the processing capacity of the robot for the work before actually installing the robot in the work site 100 using the display device 1, 1A.

DESCRIPTION OF SYMBOLS 1, 1A display device
2 augmented reality display part
3 position detection part
4 control part
5 work target management part
10 virtual robot
20 information indicating that predetermined work on a work target has been accomplished
100 work site (object)
200 conveyor (object)
300 work target (object)
WK worker (object)

What is claimed is:
1. A display device, comprising:
an augmented reality display configured to virtually display a robot that operates in accordance with a predetermined program together with objects in a work site in real space in order to check a layout of the work site and processing capacity of the robot before the robot is installed at the work site in real space;
a position sensor configured to detect a position of a work target from the augmented reality display;
a processor configured to cause the robot virtually displayed on the augmented reality display to operate based on the position of the work target detected by the position sensor to perform predetermined work on the work target; and
a controller configured to adjust a size of the robot according to a scale of the objects in the work site displayed on the augmented reality display, or to adjust a size of the objects displayed on the augmented reality display according to a scale of the robot.

2. The display device according to claim 1, further comprising:
a work target management device configured to measure a current position of the work target based on the position of the work target detected by the position sensor.

3. The display device according to claim 2, wherein the work target management device is configured to measure a movement speed of the work target from results of detecting the position at least two times by the position sensor with respect to the work target that can be regarded as the same object, and is configured to measure the current position of the work target based on the movement speed.

4. The display device according to claim 2, wherein when the current position of the work target measured by the work target management device enters a work range of the robot, the processor is configured to cause the robot to operate to perform the work while following the work target based on the current position of the work target.

5. The display device according to claim 1, wherein the augmented reality display is configured to be able to arrange the robot at an arbitrary position.

6. The display device according to claim 1, wherein the augmented reality display is configured to superimpose and display information indicating that the predetermined work has been accomplished on the work target.

7. The display device according to claim 1, wherein
the work site includes a plurality of workstations adjacent to each other to successively perform a plurality of work processes, and
the robot is positioned alongside the workstations at another location where another work process is performed.

8. A non-transitory computer-readable medium including instructions that, when executed by a processor, cause a computer to function as a display device, the display device comprising:
an augmented reality display configured to virtually display a robot that operates in accordance with a predetermined program together with objects in a work site in real space in order to check a layout of the work site and processing capacity of the robot before the robot is installed at the work site in real space;
a position sensor configured to detect a position of a work target from the augmented reality display;
a processor configured to cause the robot displayed on the augmented reality display to operate based on the position of the work target detected by the position sensor to perform predetermined work on the work target; and
a controller configured to adjust a size of the robot according to a scale of the objects in the work site displayed on the augmented reality display, or to adjust a size of the objects displayed on the augmented reality display according to a scale of the robot.

9. The non-transitory computer-readable medium according to claim 8, wherein
the work site includes a plurality of workstations adjacent to each other to successively perform a plurality of work processes, and
the robot is positioned alongside the workstations at another location where another work process is performed.

* * * * *